United States Patent [19]

Hsu

[11] Patent Number: 4,511,523

[45] Date of Patent: Apr. 16, 1985

[54] FABRICATION OF A COMPOSITE MATERIAL RACKET FRAME

[76] Inventor: Joseph Hsu, No. 306, Chung-Kang Rd., Sec. 1, Taichung, Taiwan

[21] Appl. No.: 442,092

[22] Filed: Nov. 16, 1982

[51] Int. Cl.$^3$ .............................................. B29D 27/00
[52] U.S. Cl. .................................. 264/46.6; 264/257; 264/573; 264/DIG. 83; 273/73 F; 273/73 J
[58] Field of Search ...................... 264/46.6, 257, 573, 264/DIG. 83; 273/73 R, 73 J

[56] References Cited

U.S. PATENT DOCUMENTS

| | | | |
|---|---|---|---|
| 4,268,571 | 5/1981 | McCarthy | 264/46.6 X |
| 4,294,787 | 10/1981 | Lo | 264/46.6 |
| 4,297,308 | 10/1981 | Popplewell | 264/46.6 |

*Primary Examiner*—Philip Anderson
*Attorney, Agent, or Firm*—Cushman, Darby & Cushman

[57] ABSTRACT

A method for producing a reinforced composite racket frame having an outer shell made of a fiber reinforced thermosetting plastic material and a foam core comprising the steps of: (a) placing an open-ended tubular shell of fiber reinforced thermosetting plastic material in a racket frame mold with two valve members respectively provided at an outlet and an inlet of the mold; (b) heating the mold to a first predetermined temperature for curing the tubular shell; (c) causing one of the valve members to be open and the other valve to be closed; (d) applying compressed air through the open valve to force the shell into intimate contact with an inner surface of the mold, the shell thereby assuming the shape of the mold; (e) cooling the mold to a second predetermined temperature at which the tubular shell becomes set to the mold shape; (f) opening the closed valve; (g) introducing a predetermined amount of a foamable material through at least one of the valves and into the shell; and (h) closing both of the valve members to allow the forming of a foam material at the second predetermined temperature within the tubular shell to form a core of the racket.

7 Claims, 4 Drawing Figures

FABRICATION OF A COMPOSITE MATERIAL RACKET FRAME

BACKGROUND OF THE INVENTION

The present invention is directed to a method for manufacturing a composite material racket frame. More specifically, the present invention is directed to the fabrication of a racket frame having an outer shell of resin impregnated fiber sheet and an inner core of foamed material.

There are two typical methods for fabricating a racket frame having an outer shell of resin impregnated fiber sheet and an inner core of foamed material One of these two methods is known as the self-bonding single-step molding process. In the single step method, a core element including foamable material is first inserted into an outer shell fabricated from a multi-ply sheet of resin impregnated fiber. The resulting structure is placed in a racket frame mold. The mold is then heated to foam the foamable material, and to mold the resin impregnated fiber sheet. As a result of pressure generated from the expansion of the core, the uncured outer shell is forced to contact with the inner surface of the mold thereby taking the shape of a racket frame. As it is difficult to control the uniformity of the generated pressure and the core and shell cannot simultaneously receive the heat which is transferred from the heated mold, the foaming action of the foamable material can not match the gel time of the curing thermosetting resin. If the foaming action is too late, the shell will set before it takes the shape of the mold. If the foaming action takes place too early, it causes an extreme pressure to build up and the core composiition will penetrate into the shell, thereby damaging the fiber texture of the resin impregnated fiber sheet, and weakening the endurance of the racket to the stroke.

The second of these two typical methods is known as the two-step molding method. In the two-step method, an outer tubular shell of thermosetting material surrounding a one end closed cellophane tube is placed into a mold of a racket frame. Compressed air is blown into the cellophane tube through its open end to force the outer tubular shell into contact with the inner surface of the mold so as to cause the outer tubular shell to take the shape of the racket frame. After the mold is cooled and the cured outer shell is taken out of the mold, the closed end of cellophane is cut open. After cutting open the cellophane, a foamable solution is introduced into the cured outer shell while heating it so as to foam the foamable material to form a shock absorbing core. This two-step method has an operational disadvantage in that an extra step of cutting the closed end of cellophane has to be carried out before introducing the foamable solution. In addition a higher production cost cannot be avoided because removal of cured racket frame from the mold can only be done after complete cooling of the mold. Moreover if, for blowing the foaming material the racket should be heated to a temperature higher than the heat distortion temperature of the outer shell, without the support of the mold the outer shell will be deformed due to the pressure generated from the foaming action.

SUMMARY OF THE INVENTION

Therefore the present invention provides an improved method for producing a reinforced composite material racket frame including an outer shell made of a thermosetting material and a foam core.

It is an object of the present invention to provide a method for producing a racket frame made from composite material, in which the needed heat for blowing a foamable material to form a core is supplied by the residual heat remaining after partial cooling down of the mold following an initial heating for curing the outer shell of resin impregnated fiber.

It is another object of the present invention to provide a method for producing a racket frame made from composite material, in which two valve members are used for separately controlling the steps of introducing the pressurized gas and inserting a foamable material into the outer shell, thereby eliminating the extra step of cutting off the closed end of the cured outer shell required in the prior art method of fabrication.

In essence, there is provided by the present invention a method for producing a reinforced composite racket frame including an outer shell made of a thermosetting material and a foam core comprising the steps of:

(a) placing an open-ended tubular shell of thermosetting material in a racket frame mold with two valve members respectively provided at an outlet and an inlet of the mold;

(b) heating the mold to a first predetermined temperature for curing the tubular shell;

(c) causing one of the valve members to be open and the other valve to be closed;

(d) applying compressed gas through the open valve to force the shell into contact with an inner surface of the mold, the shell thereby assuming the shape of the mold;

(e) cooling the mold to a second predetermined temperature at which the tubular shell becomes set to the mold shape;

(f) opening the closed valve;

(g) introducing a predetermined amount of a foamable material through at least one of the valves and into the shell; and (h) closing both of the valve members to allow the forming of a foam material at the second predetermined temperature within the tubular shell to form a core of the racket.

BRIEF DESCRIPTION OF THE DRAWINGS

These and other objects of the present invention will be apparent by illustrating a preferred embodiment with reference to the following drawings, in which.

DETAILED DESCRIPTION OF PREFERRED EMBODIMENT

Figure 1:
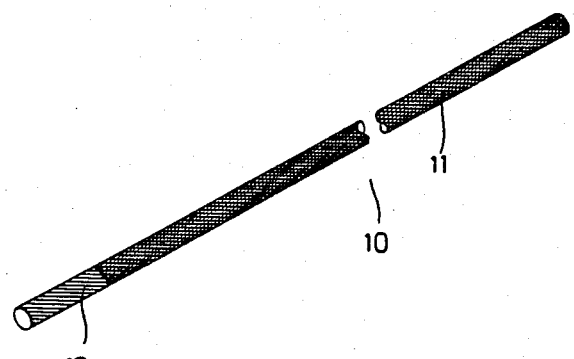
FIG. 1 is a perspective view of a tubular shell formed from an open-ended cellophane tube wrapped with a multi-ply sheet of resin impregnated fiber according to the present invention.

Referring now to FIG. 1, there is shown a tube 10 comprising a tubular shell formed from an open-ended cellophane tube wrapped with a multi-ply sheet of a resin impregnated fiber. According to the needed strength of the racket and the orientation of the woven fiber, a prepreg of resin impregnated graphite fiber is tailored to a desired shape. An iron rod of 1 cm diameter (not shown) is sleeved with an open-ended cellophane tube 12 and then placed at the margin of the prepreg and rolled to form an outer shell 11 of tube 10. The iron rod is then pulled out of the cellophane tube 12 to allow tube 12 to remain inside of outer shell 11 of tube 10.

Figure 2:
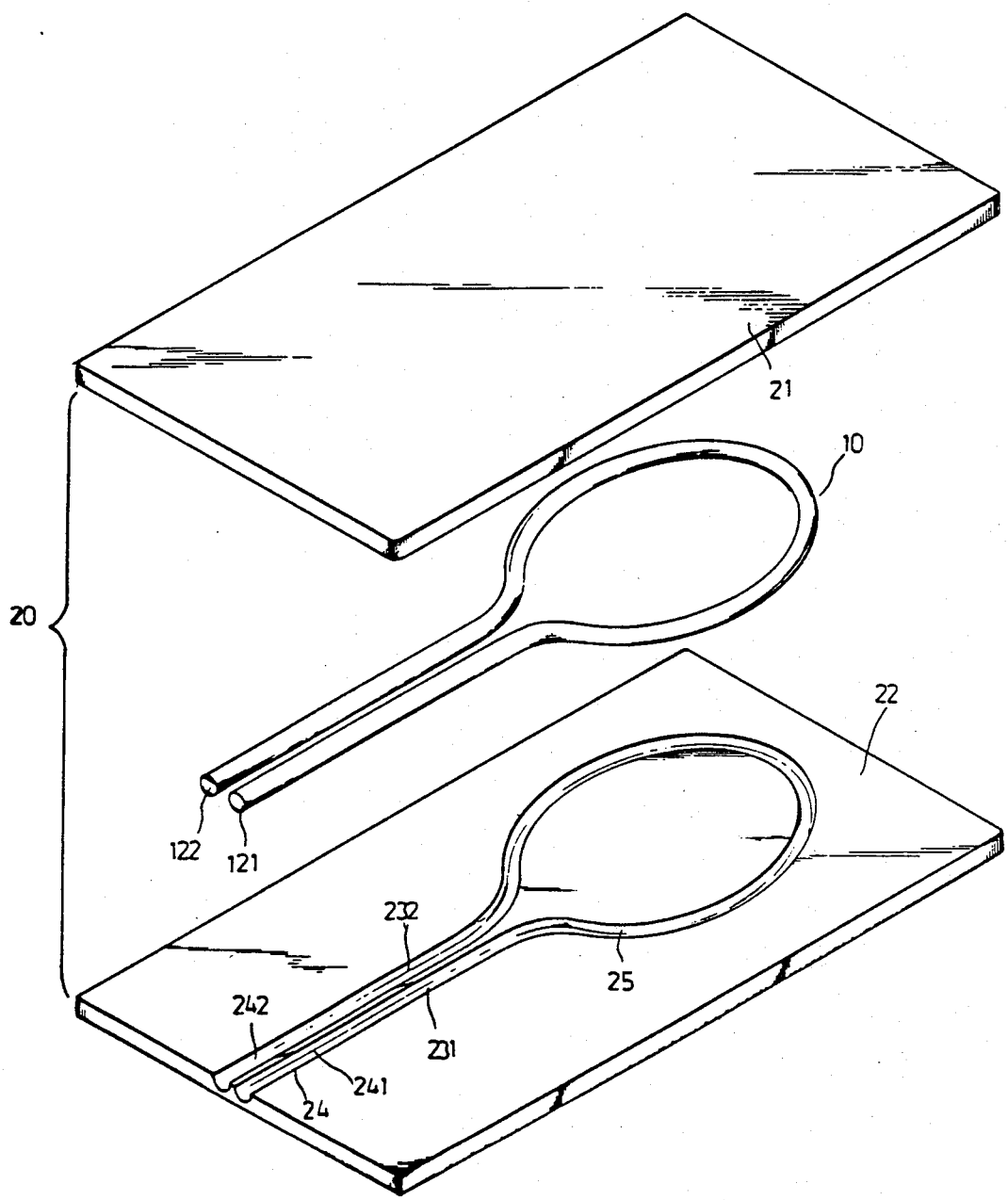
FIG. 2 is an exploded perspective view showing a mold and molded racket frame according to the present invention.

Referring to FIG. 2 there is shown an exploded perspective view showing a mold and molded racket frame. The racket frame's mold 20 includes a male mold 21 and a female mold 22. Female mold 22 includes a handle portion 23, a grip portion 24 and a ring-shaped head portion 25. Grip portion 24 includes two parallel grooves 241, 242, corresponding to two sides 231 and 232, respectively, of handle portion 23. One end of cellophane tube 12 is inserted into a groove 241 of grip portion 24. The remainder of the tube 10 is extended through one side 231, ring-shaped head portion 25, the other side 232 and finally to groove 242 of the grip portion 24.

Figure 3:
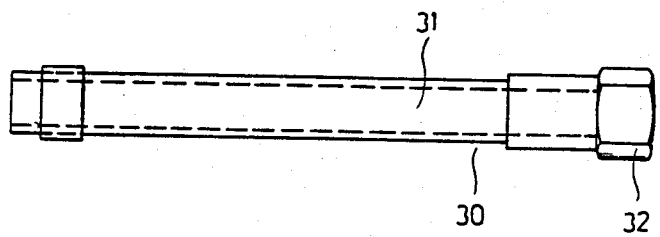
FIG. 3 is a side view of valve member of the preferred embodiment of the present invention.
Figure 4:
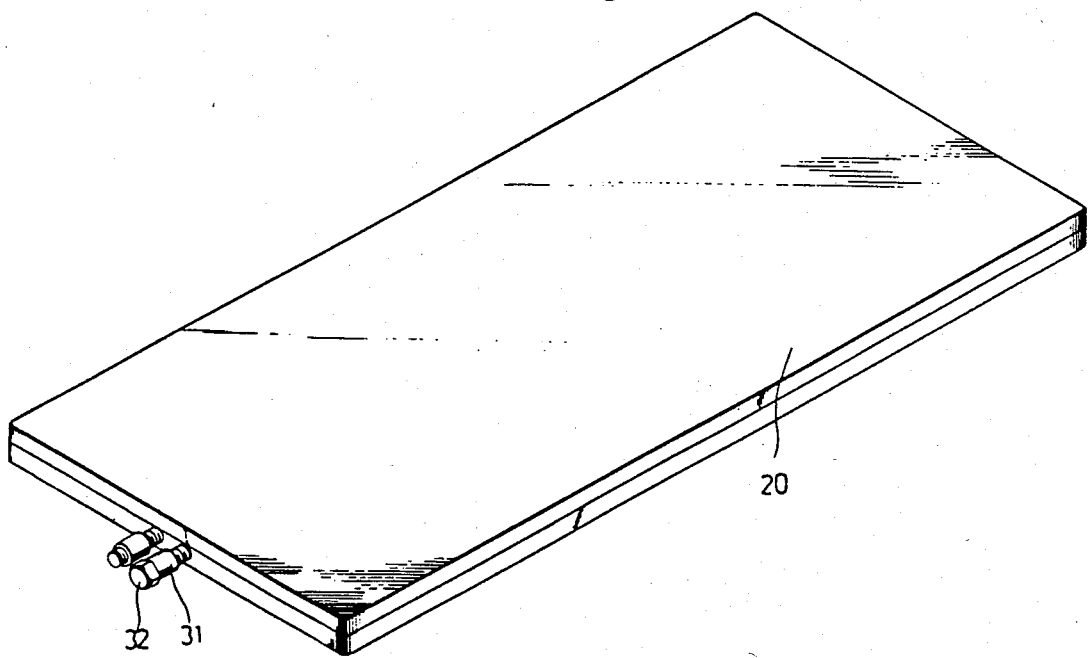
FIG. 4 is a perspective view of a mold disposed within two valve members of the preferred embodiment of the present invention.

Referring now to FIG. 3 there is shown one of the two valve members 30 used in the fabrication method according to the present invention, each valve member 30 includes a stainless steel tube 31 and a cap member 32 which can screw on an end of the steel tube 31. One end 311 (opposite the cap end) of stainless steel tube 31 is sleeved by an open end (121 or 122 shown in FIG. 2) of cellophane tube 12. Each stainless steel tube 31 exposes its end which is screwed with the cap member 32 after the mold 20 is closed, as shown in FIG. 4.

Either one of the valve members 30 is closed and the mold then is heated to a first predetermined temperature such as, for example, 150° C. and maintained at that temperature for 50 minutes. It will be noted that in the first three minutes outer shell 11 of the tube 10 starts to gel. In the meantime, an adaptor which is led to the compressed air is attached to an open end 311 of one of the tubes 31. The compressed air will be introduced into tube 10 so as to force the gelled outer shell 11 of tube 10 to intimately contact with the inner surface of the mold 20. Thus, the cured outer shell of the resin impregnated fiber takes the shape of the racket frame's mold Subsequently, the adaptor as well as the compressed air are removed from the open end 311 of the steel tube 31 and the cap member 32 is screwed out of the other end 312. A predetermined amount of foamable polyurethane solution is then introduced into the tube 10 through one of the open ends 311 when the mold has been cooled to a second predetermined temperature less than the first predetermined temperature, such as, for example, 80° C. After the introduction of the foamable solution has been completed, end 312 of stainless steel tube 31 is closed by screwing the cap member 32 onto it. Until the foamable solution starts to flow out of the other end 312, the latter will not be closed by screwing the cap member 32 on. The foamable solution within the first tube 10 will foam by absorbing the remaining heat transmitted from the outer shell 11 to form a core 13. Finally the mold is cooled to room temperature and a racket frame including outer shell and core is finished.

It can be easily found out that due to using the open ended cellophane tube, the end of cured outer shell is no longer needed to be cut-off for the subsequent step of introducing the foamable solution. Further the needed heat for blowing the foamable solution can be supplied by the remains of initial heat for curing the outer shell 11 so that the production cost can be saved.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

I claim:

1. A method for producing a reinforced composite racket frame including an outer shell made of a fiber reinforced thermosetting plastic material and a foam core comprising the steps of:
   (a) placing an open-ended tubular shell of fiber reinforced thermosetting plastic material in a racket frame mold with two valve members respectively provided at an outlet and an inlet of the mold;
   (b) heating the mold to a first predetermined temperature for curing the tubular shell;
   (c) causing one of the valve members to be open and the other valve to be closed;
   (d) applying compressed air through the open valve to force the shell into intimate contact with an inner surface of the mold, the shell thereby assuming the shape of the mold;
   (e) cooling the mold to a second predetermined temperature at which the tubular shell becomes set to the mold shape;
   (f) opening the closed valve;
   (g) introducing a predetermined amount of a foamable material through at least one of the valves and into the shell;
   (h) closing both of the valve members to allow the forming of a foam material at the second predetermined temperature within the tubular shell to form a core of the racket.

2. A method according to claim 1 wherein step (a) comprises the step of: placing into the mold a tubular shell formed by an inner open ended cellophane tube and a fiber reinforced thermosetting plastic material outer tube surrounding the cellophane inner tube.

3. A method according to claim 1 wherein step (a) comprises the step of: placing into the mold a tubular shell formed by an inner open-ended cellophane tube and a thermosetting material outer tube surrounding the cellophane inner tube the cellophane inner tube extending beyond the outer tube.

4. A method according to claim 1 wherein step (a) comprises the step of placing into the mold a tubular shell formed of a resin impregnated fiber.

5. A method according to claim 3 wherein step (a) comprises the step of: providing the valve members respectfully at two open-ended portions of the cellophane tube.

6. A method according to claim 1 wherein step (g) comprises the step of introducing foamable material through one of the valves until it flows out of the other valve.

7. A method according to claim 1 wherein step (g) comprises the step of introducing a predetermined amount of foamable material.

* * * * *